United States Patent
Matsushita

(10) Patent No.: US 10,521,891 B2
(45) Date of Patent: Dec. 31, 2019

(54) IMAGE PROCESSING APPARATUS, SYSTEM, IMAGE PROCESSING METHOD, AND NON-TRANSITORY RECORDING MEDIUM

(71) Applicant: Kazufumi Matsushita, Kanagawa (JP)

(72) Inventor: Kazufumi Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 15/908,946

(22) Filed: Mar. 1, 2018

(65) Prior Publication Data

US 2018/0268528 A1 Sep. 20, 2018

(30) Foreign Application Priority Data

Mar. 14, 2017 (JP) ................................. 2017-048858

(51) Int. Cl.
*G06K 9/46* (2006.01)
*G06T 5/00* (2006.01)
(Continued)

(52) U.S. Cl.
CPC ................ *G06T 5/006* (2013.01); *G06T 5/50* (2013.01); *H04N 5/23238* (2013.01);
(Continued)

(58) Field of Classification Search
CPC .................................. G06T 5/006; G06T 5/50
See application file for complete search history.

(56) References Cited

U.S. PATENT DOCUMENTS 8,571,345 B2 * 10/2013 Minakawa .............. G06T 5/006
  382/274
9,123,280 B2 * 9/2015 Tanaka .................... G09G 3/003
(Continued)

FOREIGN PATENT DOCUMENTS

JP 2015-073154 4/2015
JP 2015-226144 12/2015
(Continued)

*Primary Examiner* — Gregory M Desire
(74) *Attorney, Agent, or Firm* — Harness, Dickey and Pierce, P.L.C.

(57) ABSTRACT

An apparatus, system, and method of image processing, each of which: acquires a plurality of images respectively captured with a plurality of imaging elements, the plurality of images respectively corresponding to a plurality of frames of a video; calculates, for a current frame, an evaluation value to be used for evaluating each of the plurality of images using a pixel value of at least one pixel in an overlapping area of the plurality of images; determines whether an evaluation value of each of the plurality of images in a frame preceding the current frame is stored in a memory; determines at least one correction target image from the plurality of images based on the evaluation value calculated for the current frame and a determination result indicating whether the evaluation value in the preceding frame is stored; calculates a plurality of correction amounts to be used for correcting a plurality of evaluation values in the overlapping area of the correction target image, based on the evaluation value of the correction target image; and corrects the correction target image based on the plurality of correction amounts.

19 Claims, 11 Drawing Sheets

(51) Int. Cl.
    *G06T 5/50*      (2006.01)
    *H04N 5/232*     (2006.01)
    *H04N 5/357*     (2011.01)
    *G06T 3/40*      (2006.01)
    *H04N 5/225*     (2006.01)

(52) U.S. Cl.
    CPC ......... *H04N 5/3572* (2013.01); *G06T 3/4038* (2013.01); *H04N 5/2258* (2013.01)

(56)                References Cited

U.S. PATENT DOCUMENTS

| | | | |
|---|---|---|---|
| 9,214,034 B2* | 12/2015 | Riley | B60R 1/002 |
| 2006/0008176 A1* | 1/2006 | Igari | G06T 3/4038 |
| | | | 382/284 |
| 2007/0132863 A1* | 6/2007 | Deguchi | G06T 3/4038 |
| | | | 348/239 |
| 2015/0235373 A1* | 8/2015 | Kato | A61B 1/00009 |
| | | | 348/51 |
| 2017/0069104 A1* | 3/2017 | Uekusa | G06T 7/55 |
| 2017/0094169 A1* | 3/2017 | Yoshikawa | H04N 5/2254 |
| 2018/0268528 A1* | 9/2018 | Matsushita | G06T 5/006 |
| 2018/0330529 A1* | 11/2018 | Maruyama | G06T 11/60 |
| 2018/0359399 A1* | 12/2018 | Ito | H04N 5/235 |

FOREIGN PATENT DOCUMENTS

| | | |
|---|---|---|
| JP | 2016-142577 | 8/2016 |
| JP | 2017-028544 | 2/2017 |

\* cited by examiner

| COORDINATE VALUES OF POST-CONVERSION IMAGE | | COORDINATE VALUES OF IMAGE | |
|---|---|---|---|
| $\theta$ (pix) | $\phi$ (pix) | x (pix) | y (pix) |
| 0 | 0 | | |
| 1 | 0 | | |
| ⋮ | ⋮ | | |
| $\theta$ max −1 | $\phi$ max | | |
| $\theta$ max | $\phi$ max | | |

IMAGE PROCESSING APPARATUS, SYSTEM, IMAGE PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2017-048858 filed on Mar. 14, 2017, in the Japan Patent Office, the entire disclosure of which is hereby incorporated by reference herein.

BACKGROUND

Technical Field

The present invention relates to an image processing apparatus, a system, an image processing method, and a non-transitory recording medium.

Description of the Related Art

Imaging devices capable of capturing images at 360 degrees in all directions include an omnidirectional imaging camera. The omnidirectional imaging camera captures a plurality of images with a plurality of wide-angle lenses or fisheye lenses and a plurality of image sensors (hereinafter also referred to as the imaging elements), processes the obtained images through processes such as distortion correction and projective transformation, and combines the processed images to generate one spherical image.

The images captured with the imaging elements partially overlap each other. An overlapping area of the images will be referred to as the image overlapping area. To generate the spherical image, the images are combined in the image overlapping area.

The omnidirectional imaging camera captures the images across a wide area with the wide-angle lenses or the fisheye lenses. Thus, the imaging area of the omnidirectional imaging camera is likely to include a light source, such as sunlight or illumination light, which increases the possibility of flare, i.e., a whitish blur of light in a part of the images. Flare does not appear evenly across the images. Thus, an image with flare and an image without flare are different in luminance and also in color. If these images are combined, therefore, the boundary therebetween is noticeable.

Reducing the difference in the color tone of the image overlapping area between the images may make the boundary less noticeable. This method, however, does not correct areas other than the image overlapping area. Therefore, the resultant combined image still has the differences in luminance and color.

SUMMARY

Example embodiments of the present invention include an apparatus, system, and method of image processing, each of which: acquires a plurality of images respectively captured with a plurality of imaging elements, the plurality of images respectively corresponding to a plurality of frames of a video; calculates, for a current frame, an evaluation value to be used for evaluating each of the plurality of images using a pixel value of at least one pixel in an overlapping area of the plurality of images; determines whether an evaluation value of each of the plurality of images in a frame preceding the current frame is stored in a memory; determines at least one correction target image from the plurality of images based on the evaluation value calculated for the current frame and a determination result indicating whether the evaluation value in the preceding frame is stored; calculates a plurality of correction amounts to be used for correcting a plurality of evaluation values in the overlapping area of the correction target image, based on the evaluation value of the correction target image; and corrects the correction target image based on the plurality of correction amounts.

Example embodiments of the present invention include a system including the above-described image processing apparatus.

Example embodiments of the present invention include a non-transitory recording medium storing a control program for executing the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
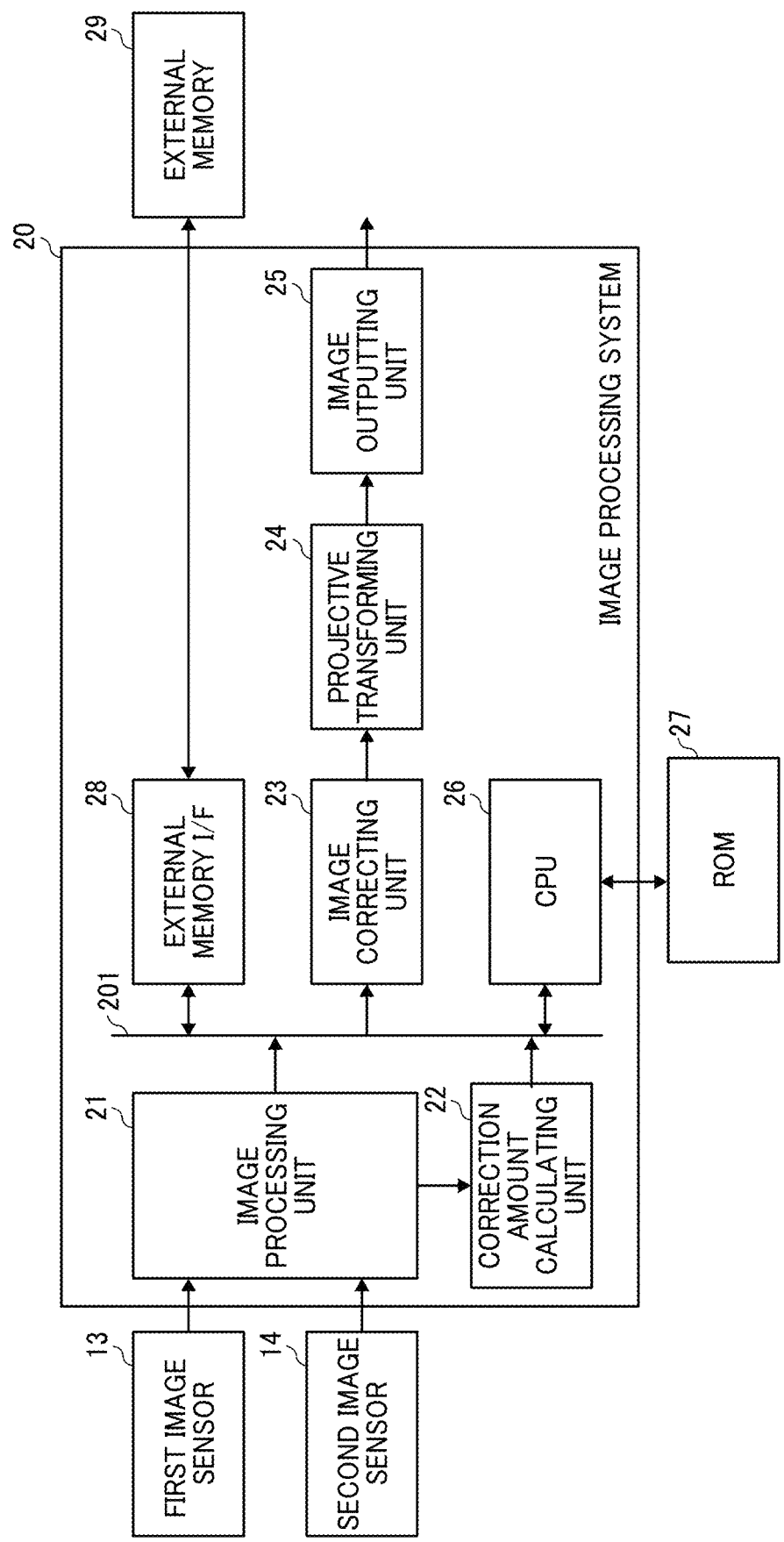
FIG. 1 is a diagram illustrating a configuration example of the hardware of an image processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the accompanying drawings, wherein like reference numerals designate identical or corresponding parts throughout the several views, an image processing system, an imaging device, an image processing method, and a non-transitory recording medium according to an embodiment of the present invention will be described.

FIG. 1 is a diagram illustrating a configuration of an image processing system 20 according to the present embodiment. FIG. 1 illustrates an example of the image processing system 20 that outputs an omnidirectional video by processing, in real time, inputs from a first image sensor 13 and a second image sensor 14 (hereinafter collectively referred to as the image sensors 13 and 14 where distinction therebetween is unnecessary). Each of the two image sensors 13 and 14 serves as an imaging element. The image processing system 20 includes an image processing unit 21, a correction amount calculating unit 22, an image correcting unit 23, a projective transforming unit 24, an image outputting unit 25, a central processing unit (CPU) 26, and an external memory interface (I/F) 28, which are connected to a bus 201.

The CPU 26 controls the image processing system 20 and the entirety of a later-described imaging device 10 in FIG. 2 including the image processing system 20. A read-only memory (ROM) 27 stores a program for starting the imaging device 10 and a conversion table, for example. The image processing unit 21 executes predetermined image processing together with the CPU 26, for example. The image processing unit 21 may be an application specific integrated circuit (ASIC).

Further, the correction amount calculating unit 22, the image correcting unit 23, the projective transforming unit 24, and the image outputting unit 25 may be implemented as a program executable by the CPU 26 or as hardware such as ASICs. The following description will be given on the assumption that the correction amount calculating unit 22, the image correcting unit 23, the projective transforming unit 24, and the image outputting unit 25 are implemented as a program executed by the CPU 26. As an another example, the correction amount calculating unit 22, the image correcting unit 23, the projective transforming unit 24, and the image outputting unit 25 may be implemented by the image processing unit 21.

Figure 2:
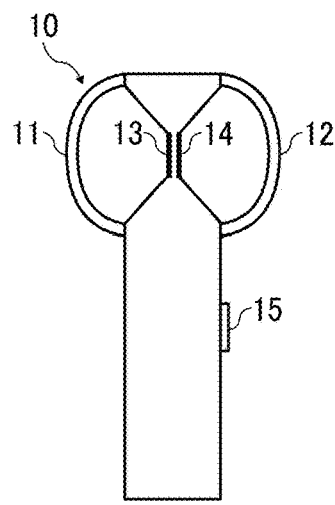
FIG. 2 is a schematic diagram illustrating an example of an imaging device including the image processing system in FIG. 1.

FIG. 2 illustrates an example of the imaging device 10 including the image processing system 20 in FIG. 1. In the following description, it is assumed that the imaging device 10 is an omnidirectional imaging camera, but the imaging device 10 is not limited thereto.

The imaging device 10 of the present embodiment includes a plurality of image sensors (i.e., the first image sensor 13 and the second image sensor 14) and an image processing system (i.e., the image processing system 20 in FIG. 1) that performs image processing on a plurality of images captured by the plurality of image sensors.

Specifically, the imaging device 10 of the present embodiment captures a video including a plurality of frames of images supplied via a plurality of fisheye lenses 11 and 12 in FIG. 2. The imaging device 10 combines the plurality of images captured by the plurality of image sensors 13 and 14 (i.e., imaging elements) in the overlapping area of the images. The process of combing the captured images in the overlapping areas may be executed with an image processing integrated circuit (IC) or with image processing software.

The imaging device 10 (an omnidirectional imaging camera in the present example) includes the two fisheye lenses 11 and 12, the two image sensors 13 and 14 corresponding thereto, and an imaging switch 15. Each of the fisheye lenses 11 and 12 has an angle of view exceeding 180 degrees to enable the imaging device 10 to capture images in all directions from the imaging position thereof. The present example illustrates the imaging device 10 configured to include two fisheye lenses and two imaging elements. However, the configuration is not limited thereto, and the imaging device 10 may include three or more fisheye lenses and three or more imaging elements. The angle of view refers here to the angle at which the imaging device 10 captures an image with the fisheye lens 11 or 12.

The fisheye lenses 11 and 12 may employ an equidistant projection system in which the distance between the fisheye lens 11 or 12 and the center of the image captured therewith is proportional to the incident angle of light. Each of the image sensors 13 and 14 may be an image sensor that converts the incident light into electrical signals, such as a charge coupled device (CCD) image sensor or a complementary metal oxide semiconductor (CMOS) image sensor. The two image sensors 13 and 14 capture images in all directions such that the images captured thereby include the overlapping area in which the captured images overlap each other.

When a user presses the imaging switch 15, exposure simultaneously takes place in the image sensors 13 and 14 in response to the pressing of the imaging switch 15 as a trigger, and the image of a subject is captured. The image sensors 13 and 14 receive and convert light into electrical signals to obtain two images (hereinafter referred to as the fisheye images to indicate that the images are obtained with the fisheye lens 11 and 12). The two fisheye images thus acquired are then subjected to image processing to be converted and combined in the overlapping area to generate a spherical image.

The imaging device 10 stores data of the generated spherical image, and outputs the generated spherical image to an apparatus including a display, such as a personal computer (PC), in response to a request from the user to display the spherical image on the display. The imaging device 10 is also capable of outputting the generated spherical image to a printer or a multifunction peripheral (MFP), for example, to print out the spherical image, or to the MFP or the PC to transmit the spherical image by facsimile transmission or electronic mail.

As described with FIG. 1, the image sensors 13 and 14 output the data of the fisheye images to the image processing unit 21 as digital data converted by an analog-to-digital (A/D) converter. The image processing unit 21 performs predetermined image processing together with the CPU 26, for example, to combine the fisheye images to generate a spherical image, and stores the data of the generated spherical image into an external memory 29 via the external memory I/F 28.

The fisheye lenses 11 and 12 will now be described with reference to FIGS. 3A and 3B. The fisheye lenses 11 and 12 are similar in configuration, and thus the following description with FIGS. 3A and 3B will be limited to the fisheye lens 11.

The fisheye lens 11 has the angle of view exceeding 180 degrees, as described above. Therefore, the fisheye image of a subject captured with the fisheye lens 11 and the corresponding image sensor 13 is substantially hemispherical around the imaging position.

Figure 3A:
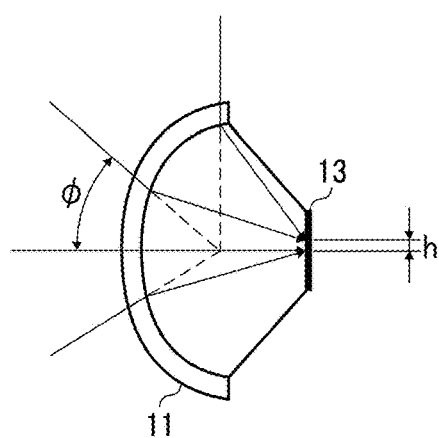
FIGS. 3A and 3B are diagrams illustrating a fisheye lens used in the imaging device in FIG. 2.
Figure 3B:
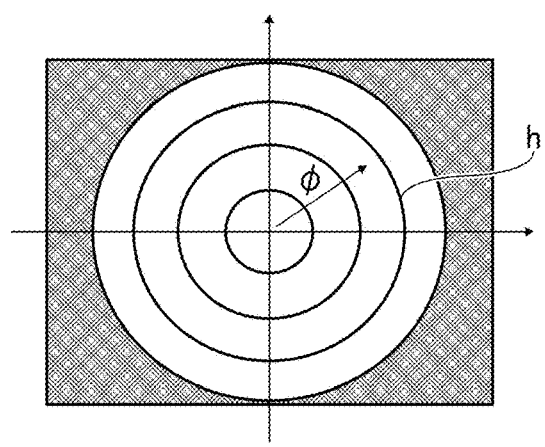

Herein, as illustrated in FIG. 3A, the relationship between an incident angle $\varphi$ of the light on the fisheye lens 11, an image height h corresponding to the distance between the center of the image and the image point, and a projection function f is expressed as $h=f(\varphi)$.

The projection function f varies depending on properties of the fisheye lens 11. For example, if the fisheye lens 11 employs the equidistant projection system, there is a proportional relationship in which the image height h increases with an increase in the incident angle $\varphi$, as indicated by an arrow in FIG. 3B. In FIG. 3B, the light is not incident on the fisheye lens 11 in a solid black area outside the outermost circle.

Since each of the fisheye lenses 11 and 12 has an angle of view exceeding 180 degrees, two fisheye images captured by the image sensors 13 and 14 include the overlapping area.

Figure 4A:
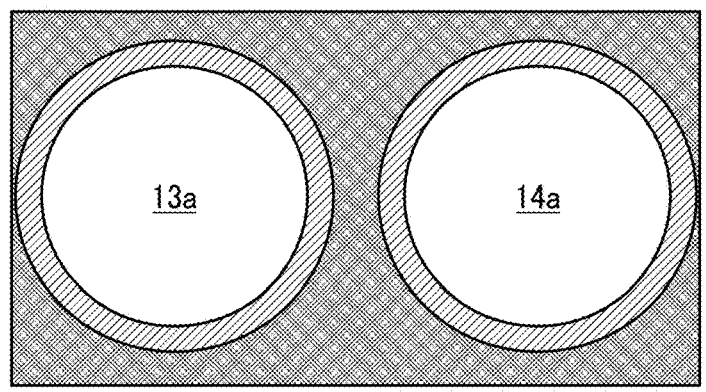
FIGS. 4A to 4D are diagrams illustrating an overlapping area of a plurality of images.
Figure 4B:
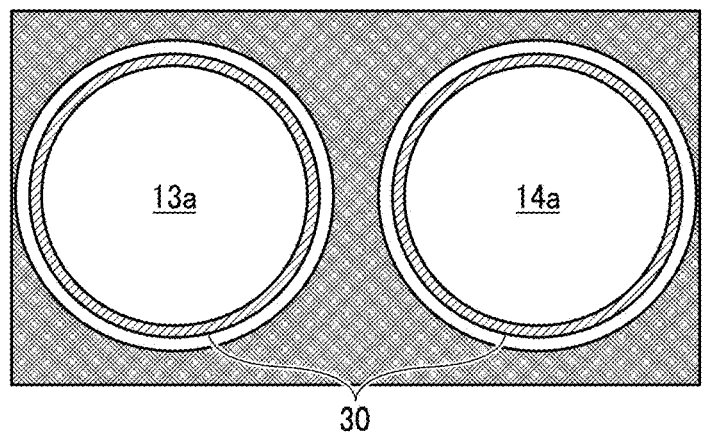
Figure 4C:
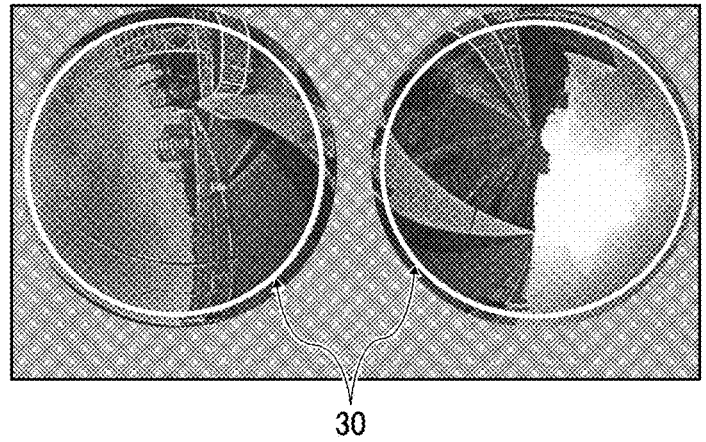

With reference to FIGS. 4A to 4C, the overlapping area of two fisheye images 13a and 14a captured by the image sensors 13 and 14 will be described.

In each of the fisheye images 13a and 14a in FIG. 4A captured by the image sensors 13 and 14, there is no incidence of light in a solid black area, and the incident angle of the light does not exceed 90 degrees in a white area and exceeds 90 degrees in a hatched area.

The hatching in FIG. 4A indicates an image area in which the two fisheye images 13a and 14a overlap each other. Thus, such an image area may be defined as the overlapping area. In the fisheye lenses 11 and 12, however, distortion or aberration is more likely to occur with an increase in the image height h and an increase in the distance of the image point from the center of the image. Further, objects around the fisheye lenses 11 and 12, such as frames located outside thereof, may be included in the captured fisheye images 13a and 14a. When combining the fisheye images 13a and 14a, it is undesirable to use distorted or aberrated parts of the fisheye images 13a and 14a and parts of the fisheye images 13a and 14a including objects such as outside frames.

As illustrated in FIG. 4B, therefore, the overlapping area 30 is limited here to a ring-shaped area with a predetermined width corresponding to an inner circumferential part of the hatched area in FIG. 4A. The two fisheye images 13a and 14a in FIG. 4B are captured through the exposure that simultaneously takes place in the image sensors 13 and 14. Therefore, the overlapping area 30 of the fisheye image 13a and the overlapping area 30 of the fisheye image 14a basically include the image of the same subject. It is desirable to set the overlapping area 30 in pixel units to absorb deviation due to an error in optical design.

Figure 4D:
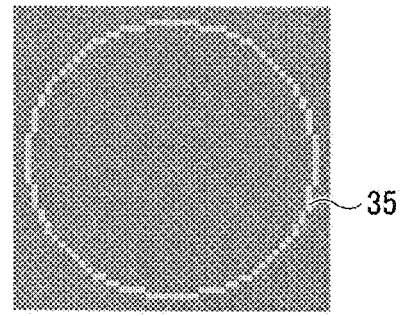

FIG. 4C illustrates actually captured images and the overlapping area 30 thereof. FIG. 4D illustrates later-described evaluation areas 35 in the overlapping area 30.

A method of generating the spherical image will now be described with reference to FIGS. 5A and 5B.

Figure 5A:
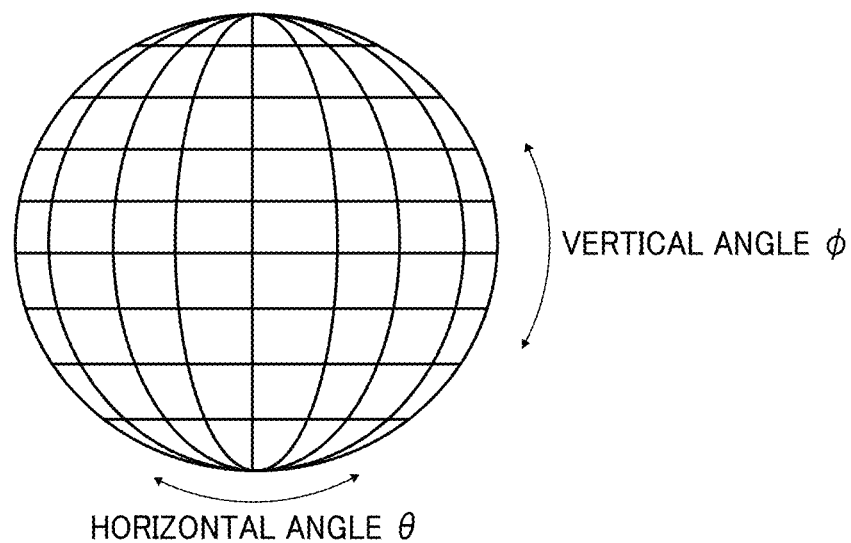
FIGS. 5A and 5B are diagrams illustrating a format of a spherical image.

A fisheye image is in a format in which a substantially hemispherical surface is expressed in a circular shape, as illustrated in FIG. 5A. In this example, a horizontal angle $\theta$ and a vertical angle $\varphi$ correspond to longitude and latitude on a globe, respectively. The horizontal angle $\theta$ ranges from 0 degrees to 360 degrees, and the vertical angle $\varphi$ ranges from 0 degrees to 180 degrees. More specifically, one of the two image sensors 13 and 14 captures a front hemispherical image, and the other one of the two image sensors 13 and 14 captures a rear hemispherical image.

Figure 5B:
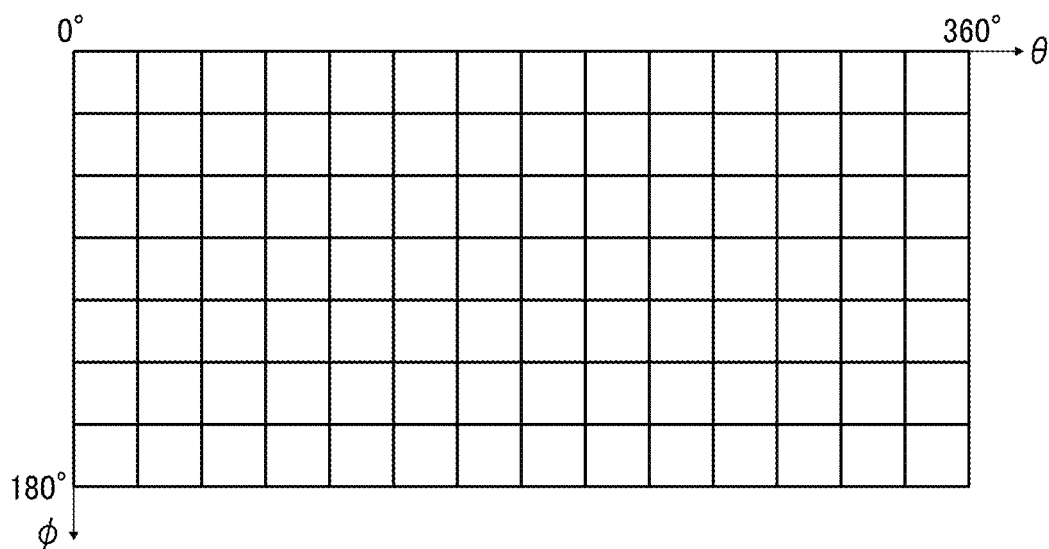

The spherical image is generated in a rectangular format illustrated in FIG. 5B. Specifically, the spherical image is generated by combining the two hemispherical images captured by the two image sensors 13 and 14 such that the horizontal direction corresponds to the horizontal angle $\theta$ and the vertical direction corresponds to the vertical angle $\varphi$. Each of the two hemispherical images is actually larger than the image of a hemisphere owing to the overlapping area, but will be referred to here as the hemispherical image for convenience.

Each of the two hemispherical images is generated such that a pixel having a given horizontal angle and a given vertical angle in the corresponding fisheye image and a pixel having the same horizontal angle and the same vertical angle in the rectangular format in FIG. 5B have the same pixel value. The hemispherical images are generated by projective transformation performed on the fisheye images. The two hemispherical images generated by the projective transformation are combined to generate the spherical image, which is 360-degree omnidirectional both in the horizontal direction and the vertical direction.

Figures 6A, 6B:
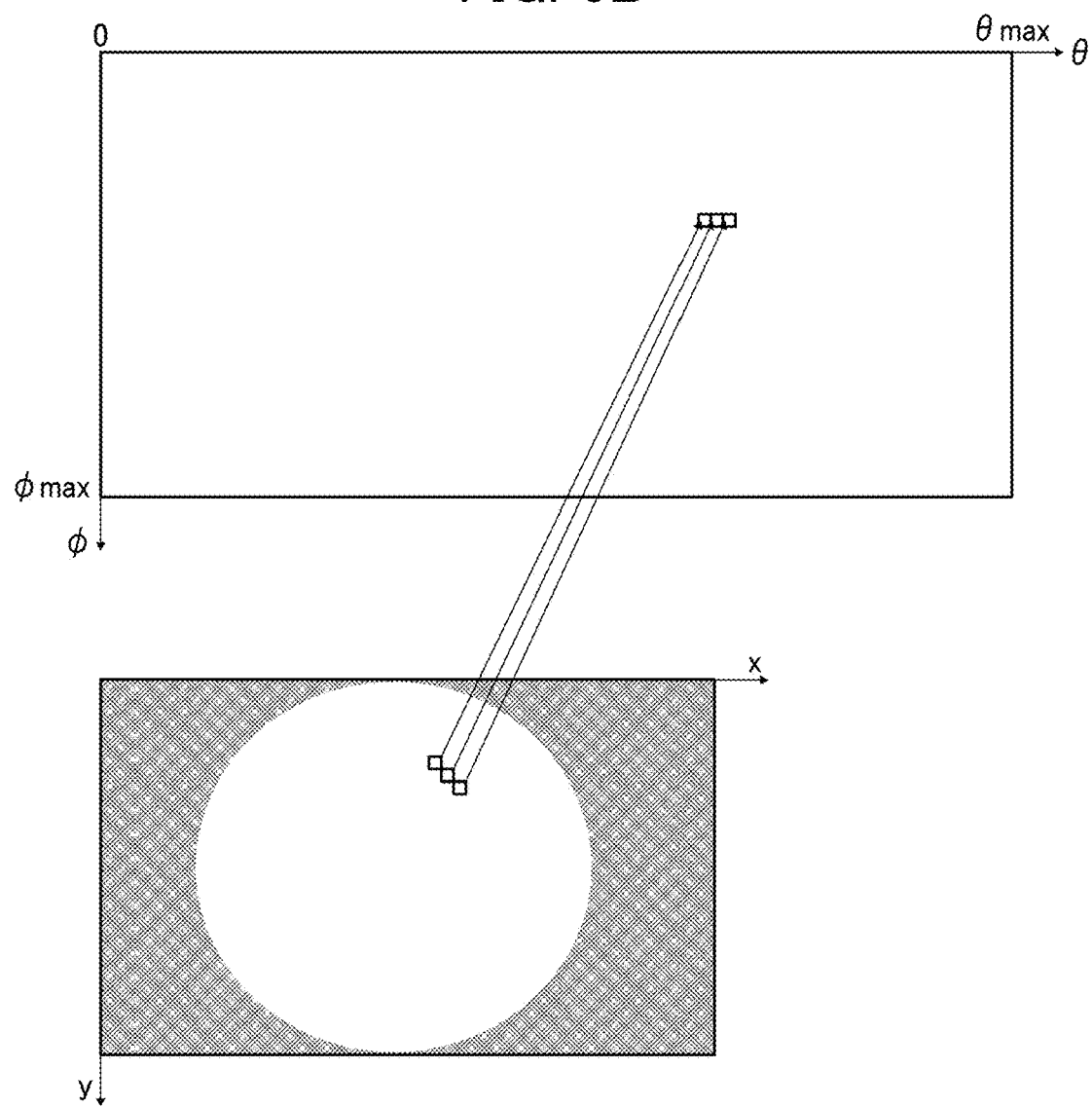
FIGS. 6A and 6B are diagrams illustrating a conversion table for converting a fisheye image into a spherical image.

FIG. 6A illustrates an example of a conversion table for use in the projective transformation of a fisheye image. As illustrated in FIG. 6A, the conversion table associates coordinate values of the fisheye image (i.e., a pre-conversion image), which correspond to the values of the horizontal angles and the vertical angles of the fisheye image, with coordinate values of the corresponding hemispherical image (i.e., a post-conversion image). The coordinate values of the pre-conversion image are represented as (x, y), and the coordinate values of the post-conversion image are represented as ($\theta$, $\varphi$). As illustrated in FIG. 6B, pixels in the pre-conversion image and the corresponding pixels in the post-conversion image are both determined with reference to coordinates (0, 0) at the upper-left corner of each of the pre-conversion image and the post-conversion image. The combinations of the coordinate values of these pixels are stored in the conversion table as data. The correspondence between the coordinate values is calculated from the projective relationship between the pre-conversion image and the post-conversion image.

The conversion table may previously be created for each of the two fisheye lenses 11 and 12 and the two image sensors 13 and 14 based on information such as lens design data, and may be stored in the ROM 27 in FIG. 1 to be read and used as necessary. The conversion table is used in the projective transformation of the fisheye images to correct the distortion of the fisheye images. The corrected fisheye images are then combined to generate the spherical image.

A procedure of a process of generating the spherical image will now be described. When the user presses the imaging switch 15, the two image sensors 13 and 14 capture the two fisheye images 13a and 14a. With input of the two fisheye images 13a and 14a, the image processing system 20 starts the following spherical image generation process, which is executed by the CPU 26.

The fisheye images 13a and 14a are first subjected to the projective transformation with the conversion table stored in the ROM 27, such as the conversion table illustrated in FIG. 6A, to correct the distortion of the fisheye images 13a and 14a. With this distortion correction, two hemispherical images such as the image in FIG. 5A are obtained.

Then, a combining position is detected to combine the obtained two hemispherical images in the overlapping area 30, and the conversion table is corrected based on the detected combining position. Then, rotational transformation is performed on the corrected conversion table to create an image generating conversion table. The rotational transformation is performed to make the vertical direction of the image match the zenith direction of the imaging device 10 in the image generating conversion table.

With the image generating conversion table, the projective transformation is performed on the two fisheye images 13a and 14a to generate two distortion-corrected images. Then, a blending process is executed to combine the two distortion-corrected images. The two images are combined in the overlapping area 30 thereof. If only one of the two images includes data in the overlapping area 30, the data is used to combine the two images. With the above-described procedure, the spherical image is generated.

To eliminate differences in luminance and color of the overlapping area 30 between the fisheye image 13a obtained by the image sensor 13 and the fisheye image 14a obtained by the image sensor 14, a correction target image is determined based on an evaluation value of the evaluation areas 35 in FIG. 4D. According to an existing correction method, the presence or absence of the correction target image is determined without reference of evaluation values between adjacent frames. When a video alternates between a corrected frame and an uncorrected frame, therefore, a viewer may feel as if watching flickering images. Further, a block configuration for performing such a correction method has an issue of real-time performance.

In the present embodiment, therefore, correction amounts for correcting the images are calculated with reference to the evaluation values of the images in the preceding frame before the image processing unit 21 in FIG. 1 stores image data into the external memory 29, and a correction process is performed before the images are input to the projective transforming unit 24.

Figure 7:
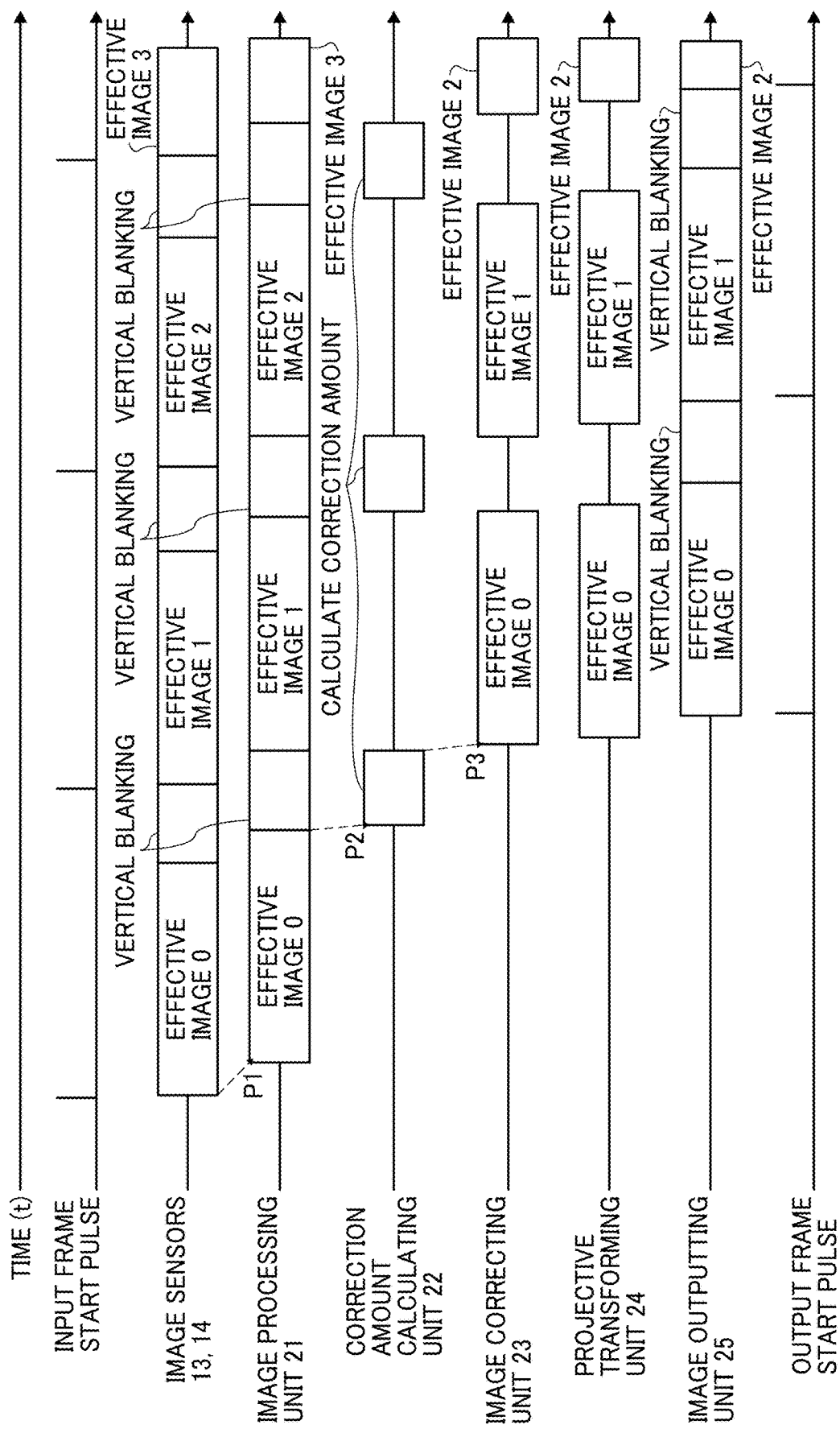
FIG. 7 is a timing chart schematically illustrating procedures of processes performed in the image processing system.

FIG. 7 is a timing chart of processes performed by the image processing system 20 of the present embodiment. In FIG. 7, processing procedures of the image sensors 13 and 14 and component elements of the image processing system 20 in FIG. 1, such as the image processing unit 21, the correction amount calculating unit 22, the image correcting unit 23, the projective transforming unit 24, and the image outputting unit 25, are illustrated in this order from the top. Further, FIG. 7 illustrates the lapse of time (t) rightward, and also illustrates an input frame start pulse and an output frame start pulse.

Images from the image sensors 13 and 14 are continuously input to the image processing unit 21 as images of a video. The image processing unit 21 performs predetermined image processing, which is performed in a normal imaging device.

The predetermined image processing starts when an effective image 0 starts to be input at time P1.

The image processing unit 21 stores the effective image 0 input from each of the image sensor 13 and 14 into the external memory 29, and transmits the effective image 0 to the correction amount calculating unit 22.

Based on the effective image 0 input from the image sensors 13 and 14, the correction amount calculating unit 22 calculates the correction amounts. In the calculation of the correction amounts, the correction amount calculating unit 22 performs a process of determining the correction target image with reference to the evaluation values of the images in the preceding frame.

The correction amount calculating unit 22 starts calculating the correction amounts when the input of the effective image 0 is completed at time P2. The correction amount calculating unit 22 completes calculating the correction amounts before the image processing unit 21 stores the effective image 0 in the external memory 29.

When the correction amount calculating unit 22 has completed the process of calculating the correction amounts at time P3, the image correcting unit 23 reads the effective image 0 stored in the external memory 29, and corrects the effective image 0 based on the calculated correction amounts. Thereafter, the projective transforming unit 24 converts the corrected effective image 0 into a spherical image. That is, the correction process precedes the input of the effective image 0 to the projective transforming unit 24. Then, the image outputting unit 25 outputs the converted effective image 0.

In the processing of the present embodiment, each image is output with an approximate delay of one frame from the input of the image from the image sensors 13 and 14, as illustrated in FIG. 7, thereby achieving low-delay correction.

Details of processes performed in the image processing system 20 of the present embodiment will now be described.

Figure 8:
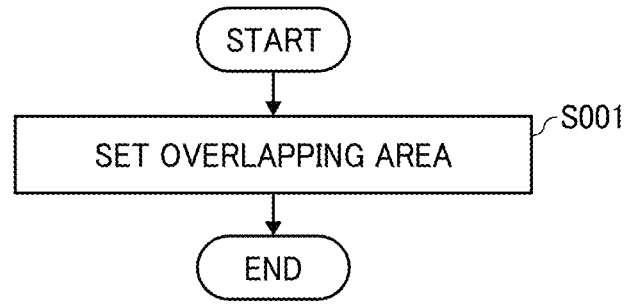
FIG. 8 is a flowchart illustrating a procedure of an initial setting process.

FIG. 8 illustrates a procedure of an initial setting process performed by the CPU 26 when the image processing system 20 of the present embodiment starts. At step S001 of the initial setting process, the CPU 26 sets the overlapping area 30. Strictly speaking, the overlapping area 30 changes depending on the distance to the subject. This process of setting the overlapping area 30 is performed in block units with mean values, without involving comparison in pixel units, and thus is not required to be performed with high accuracy.

A process of the correction amount calculating unit 22 will now be described.

Figure 9:
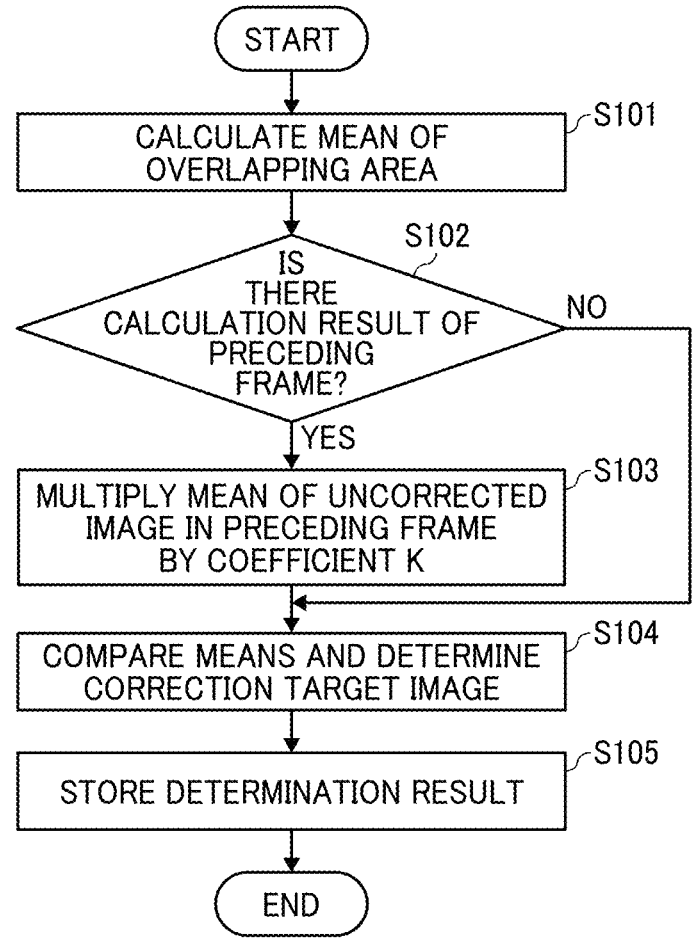
FIG. 9 is a flowchart illustrating a procedure of a correction target image determining process.

FIG. 9 illustrates a procedure of the process of determining the correction target image (i.e., a correction surface) performed by the correction amount calculating unit 22. In this example, when there are some differences in color tone throughout the image, such area is subjected to correction. Step S101 starts in response to the calculation of the evaluation value. Herein, the evaluation value is calculated by the CPU 26, which functions as an arithmetic unit of the image processing system 20. The evaluation value is calculated with the following calculation method, but may be calculated with any other method capable of calculating the evaluation value.

The CPU 26 calculates the evaluation value to evaluate each of the images with the pixel value of at least one pixel in the overlapping area 30 of each of the images. The evaluation value may be the mean or variance of the pixel values of a plurality of pixels in the overlapping area 30, for example. If the images are color images based on RGB color space, each of the pixel values may include the respective signal amounts of red (R), green (G), and blue (B) colors. If the images are based on YCbCr color space, each of the pixel values may include the luminance value, the hue and saturation values of blue color, and hue and saturation values of red color.

Each of the input two fisheye images 13a and 14a is first divided into a predetermined number of rectangular evaluation areas having the same size. For example, if each of the fisheye images 13a and 14a has a size of 1952 pixels×1932 pixels, the fisheye image may be divided into 48×48 evaluation areas. This number of divisions is illustrative, and an optimal number of divisions may be determined and adopted based on tests, for example.

The CPU 26 then detects parts of the plurality of evaluation areas completely included in the overlapping area 30 as the evaluation areas 35 corresponding to the overlapping area 30. FIG. 4D illustrates an example of the detected evaluation areas 35.

Each of the detected evaluation areas 35 includes a plurality of pixels, each of which has a pixel value. The evaluation value of the evaluation areas 35 is calculated as follows. The pixel values of the pixels included in each of the evaluation areas 35 are added up and divided by the number of the pixels to calculate the mean for the evaluation area 35. Further, the means calculated for the respective evaluation areas 35 are added up and divided by the number of the evaluation areas 35 to calculate the mean for the evaluation areas 35, to thereby calculate the evaluation value of the evaluation areas 35. Alternatively, the mean calculated for each of the evaluation areas 35 may be used to calculate the variance thereof, and thereby calculate the evaluation value. Therefore, the above-described mean or variance may be used for the evaluation value.

At step S101 in FIG. 9, the correction amount calculating unit 22 averages all means of the evaluation areas 35 in the overlapping area 30 thus calculated as the evaluation values, to thereby calculate the mean of the means. The correction amount calculating unit 22 performs this calculation process for each of the images to be combined. To combine two images, therefore, the correction amount calculating unit 22 calculates the mean for each of the two images.

The correction amount calculating unit 22 compares the means calculated at step S101 for the images to be combined. Before the comparison, the correction amount calculating unit 22 determines whether there is a calculation result of the preceding frame (step S102). If there is no calculation result of the preceding frame (NO at step S102), the correction amount calculating unit 22 uses the values calculated at step S101 in the comparison.

If there is a calculation result of the preceding frame (YES at step S102), the correction amount calculating unit 22 multiplies the mean of an uncorrected one of the images in the preceding frame by a coefficient K greater than 1 to use the value resulting from the multiplication in the comparison (step S103).

Then, the correction amount calculating unit 22 compares the means calculated at step S101 (step S104). Herein, the correction amount calculating unit 22 calculates the absolute value of the difference between the means, and extracts the image with the minimum mean. Then, the correction amount calculating unit 22 outputs information of the absolute value of the difference and the extracted image as a determination result. For example, when images 1 and 2 to be combined have means AVE_1 and AVE_2, respectively, the determination result includes the absolute value |AVE_1−AVE_2|, indicating that the correction target image is the image 2 if the mean AVE_1 is greater than the means AVE_2 and that the correction target image is the image 1 if the mean AVE_1 is equals to or less than the means AVE_2.

The correction amount calculating unit 22 stores the determination result (step S105), and completes the process.

A subsequent process of the correction amount calculating unit 22 will now be described.

Figure 10:
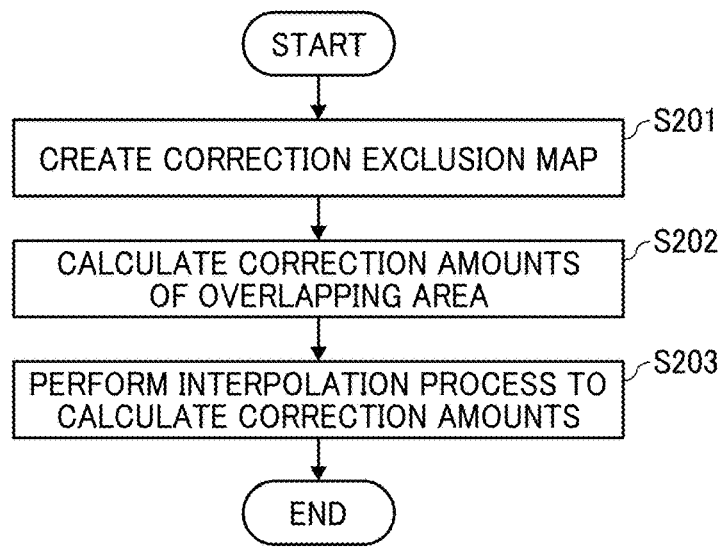
FIG. 10 is a flowchart illustrating a procedure of a process of a correction amount calculating unit of the image processing system.

FIG. 10 illustrates a procedure of a process of creating a correction amount map and a correction exclusion map performed by the correction amount calculating unit 22.

With the above-described correction target image determination result, the correction amount calculating unit 22 creates the correction exclusion map that specifies an area excluded from the correction (step S201).

In the correction exclusion map, values excluded from the correction are stored in blocks at positions corresponding to evaluation areas included in a correction exclusion area of the correction target image. The correction exclusion area is determined to be excluded from the correction based on the pixel values of the pixels forming the correction target image. Values to be corrected are stored in the other blocks of the correction exclusion map.

To correct an image subjected to image correction (for example, an image with flare) based on an image not subjected to image correction (for example, an image without flare) and with the minimum mean, the entirety of the image subjected to correction is corrected. If the entire image is corrected, however, the overall luminance of the image is reduced, changing the color of the image. If such an image is combined with the image not subjected to image correction, a visually unnatural image is formed. For example, when actual luminance and color of a light source are equal to the luminance and color of the light source in the image subjected to image correction, the correction reduces the luminance of the image and darkens the image. Therefore, the correction exclusion map is created not to correct the image of a subject that is desired to be excluded from the correction, such as a light source.

At step S202, the correction amount calculating unit 22 calculates the correction amounts of the overlapping area 30 from the evaluation value of the evaluation areas 35 in the overlapping area 30, which is expressed as the mean or variance. The correction amounts include numerical values of the extent to which the luminance value is to be reduced and the extent to which the color is to be changed.

At step S203, the correction amount calculating unit 22 performs an interpolation process to calculate the correction amounts of the entire correction target image, i.e., the entire image subjected to correction (the image with flare), based on the correction amounts calculated at step S202, and thereby creates the correction amount map with the calculated correction amounts. In the correction amount map, the calculated correction amounts are stored in blocks at positions corresponding to the evaluation areas of the correction target image.

The correction amount calculating unit 22 stores the thus-created correction amount map and correction exclusion map in the external memory 29, and transmits the correction amount map and the correction exclusion map to the image correcting unit 23. If the correction amount calculating unit 22 is an ASIC or a field-programmable gate array (FPGA), for example, the correction amount calculating unit 22 may store the correction amount map and the correction exclusion map not in the external memory 29 but in a static random access memory (SRAM) or the like included in the correction amount calculating unit 22.

A process of the image correcting unit 23 will now be described.

Figure 11:
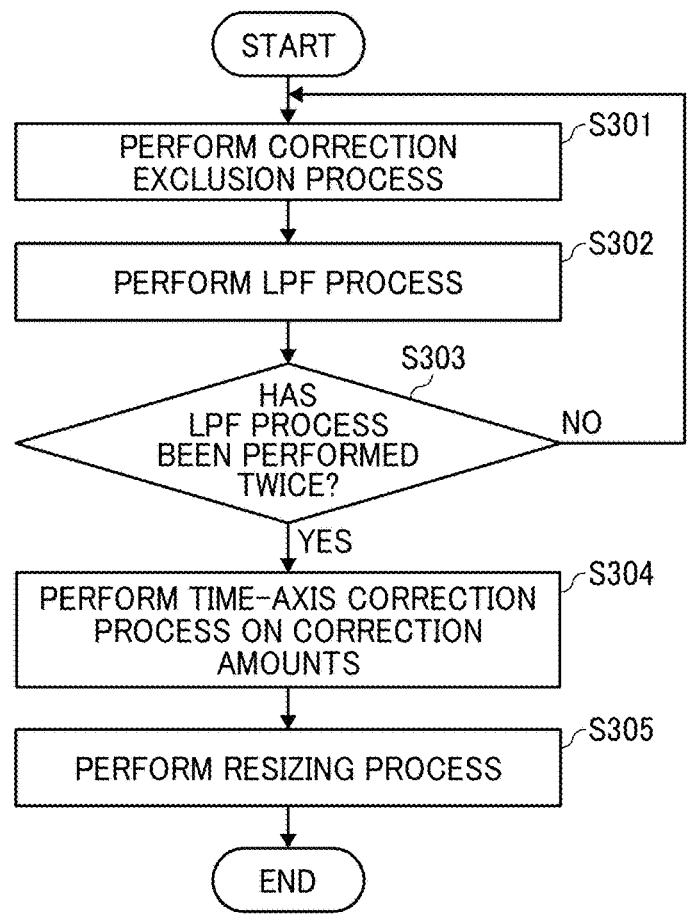
FIG. 11 is a flowchart illustrating a procedure of a process of an image correcting unit of the image processing system.

FIG. 11 illustrates a procedure of a process performed by the image correcting unit 23. The image correcting unit 23 first performs a correction exclusion process of applying the correction exclusion map to the correction amount map created by the correction amount calculating unit 22 to correct the correction amount map (step S301). Then, if any of the correction values in the correction amount map is extremely high or low, the image correcting unit 23 performs a leveling process of leveling such a value, i.e., a low-pass filter (LPF) process (step S302). The LPF may be a Gaussian filter.

The LPF process may be performed more than once. An increase in the number of executions of the LPF process, however, substantially changes the correction values for the image excluded from the correction, making the correction exclusion less meaningful. It is therefore preferable to set the number of executions of the LPF process as small as possible. In the embodiment illustrated in FIG. 11, the LPF process is performed twice, as described in step S303.

At step S303, the image correcting unit 23 determines whether the LPF process has been performed twice. If the LPF process has not been performed twice (NO at step S303), the image correcting unit 23 returns to step S301.

If the LPF process has been performed twice (YES at step S303), the image correcting unit 23 performs a time-axis correction process of performing inter-frame correction on the time axis (step S304).

Specifically, the time-axis correction process is correction between consecutive frames including images such as the effective images 0, 1, and 2 in FIG. 7.

The time-axis correction process reduces variations of the correction amounts between the frames, thereby preventing flickering between the frames.

To prevent deterioration of real-time performance, it is desirable to perform the time-axis correction process with a filter circuit, such as an infinite impulse response (IIR) filter, or with a processing method using the mean of the correction amounts of frames up to the immediately preceding frame.

The image correcting unit 23 then performs a resizing process of resizing the correction amount map (step S305) The resizing process changes the number of evaluation areas in the correction amount map to the number of pixels in the correction target image.

The size of the correction amount map generated by step S301 corresponds to the number of divisions for dividing each of the fisheye images in the horizontal direction and the vertical direction. That is, if each of the fisheye images is divided into 48×48 evaluation areas, the correction amount map has a size of 48 pixels×48 pixels.

In the above-described example, the actual size of each of the fisheye images 13*a* and 14*a* is 1952 pixels×1932 pixels. Thus, the resizing process changes the size from 48 pixels× 48 pixels to 1952 pixels×1932 pixels. When the resizing process is completed, the process of the image correcting unit 23 is completed.

The image correcting unit 23 may change the size of the correction amount map with any existing resizing method, such as the bilinear method, the nearest neighbor method, or the bicubic method, for example.

An application example of the above-described correction process to an actual image will be described with reference to FIGS. 12 to 15.

Figure 12:
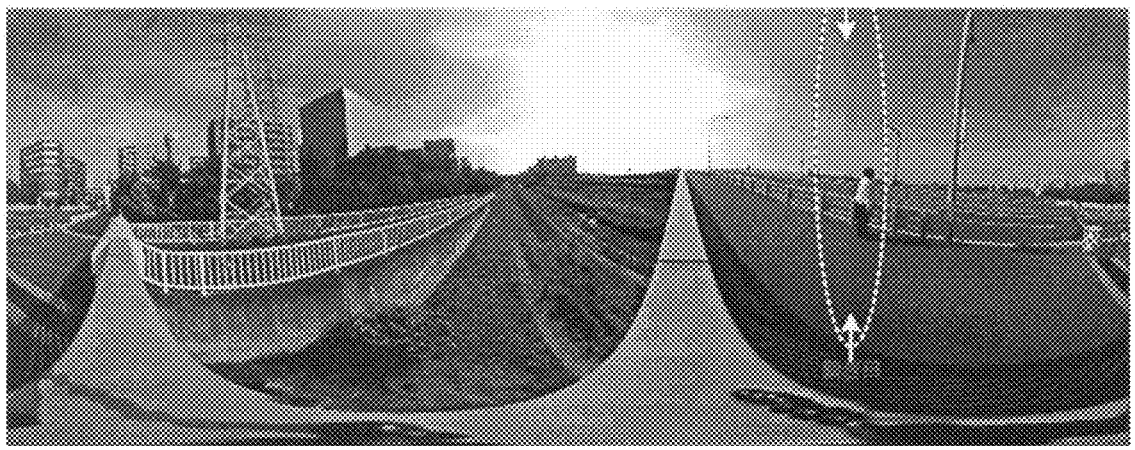
FIG. 12 is a diagram illustrating an example of a spherical image before being subjected to a correction process.

FIG. 12 illustrates an example of the spherical image before being subjected to the correction process. The two images illustrated in FIG. 4C are combined to form this spherical image. Flare due to sunlight is present in one of the two images and absent in the other one of the two images, making a boundary between the images noticeable, as indicated by arrows in a broken-line circle.

Figure 13:
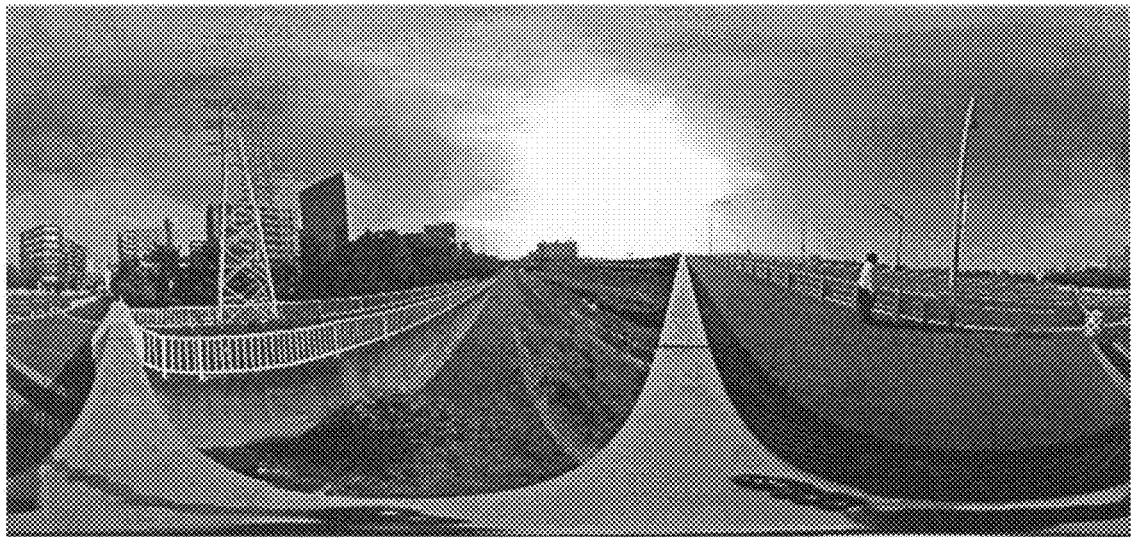
FIG. 13 is a diagram illustrating the spherical image of FIG. 12 subjected to a correction process of the present embodiment.

FIG. 13 illustrates an example of the spherical image subjected to the correction process of the present embodiment. In this example, the boundary between the combined images is corrected, as compared with that in FIG. 12.

Figure 14:
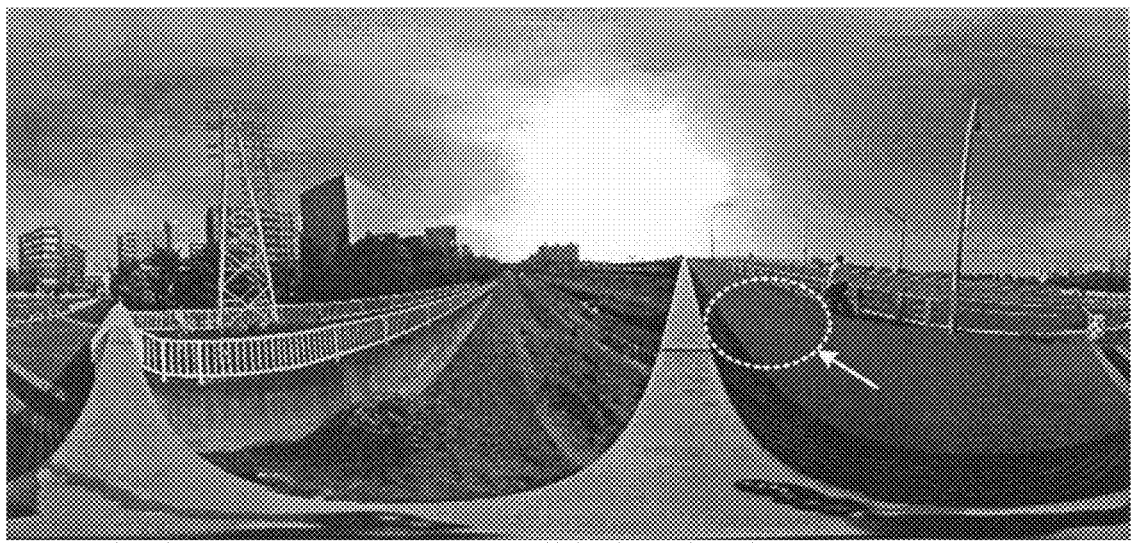
FIG. 14 is a diagram illustrating an image in a fame following the frame of the spherical image of FIG. 13 and subjected to a correction process not involving a time-axis correction.
Figure 15:
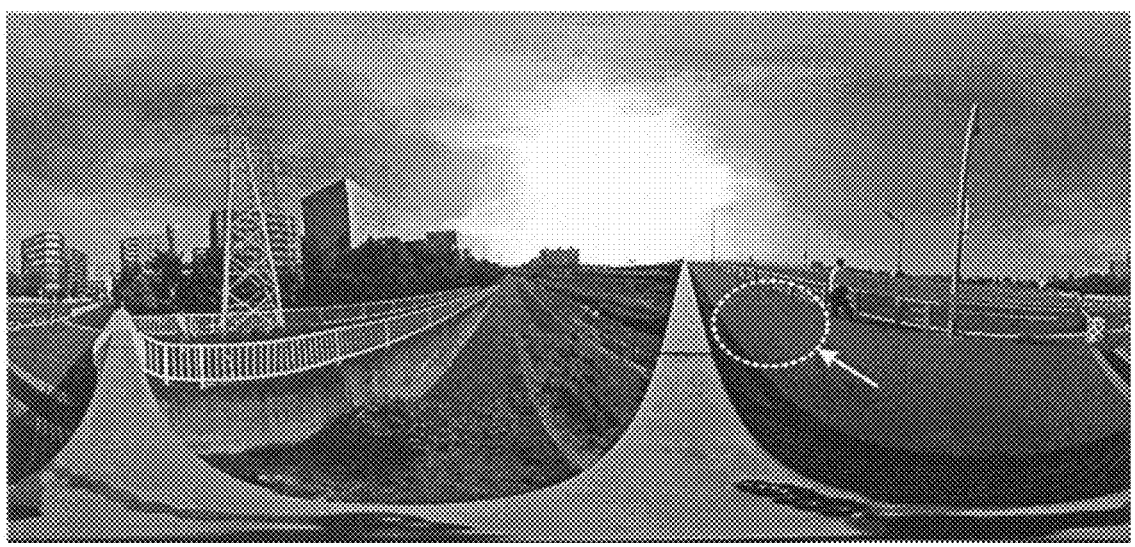
FIG. 15 is a diagram illustrating an image in the same frame as that of FIG. 14 and subjected to a correction process of the present embodiment involving the time-axis correction.

FIGS. 14 and 15 illustrate the same image appearing a few frames after the image of FIG. 13 in the video. The image of FIG. 14 is subjected to a related-art correction process not involving the time-axis correction. The image of FIG. 15 is subjected to the time-axis correction by the image processing system 20 of the present embodiment. In FIG. 15, the color of a road in a broken-line circle is the same as that in the previous frame in FIG. 13. In FIG. 14, however, the color of the road in the broken-line circle is different from that in the previous frame in FIG. 13.

The presence of a human figure in a boundary area in FIG. 12 changes the luminance values and thus the correction amounts. In the image of FIG. 14 subjected to the related-art correction process, therefore, the correction amounts in the road area are changed, changing the luminance values of the corrected image. The correction result as illustrated in FIG. 14 causes flickering of the video, thereby causing uncomfortable feeling to a viewer during transition between frames.

Figure 16A:
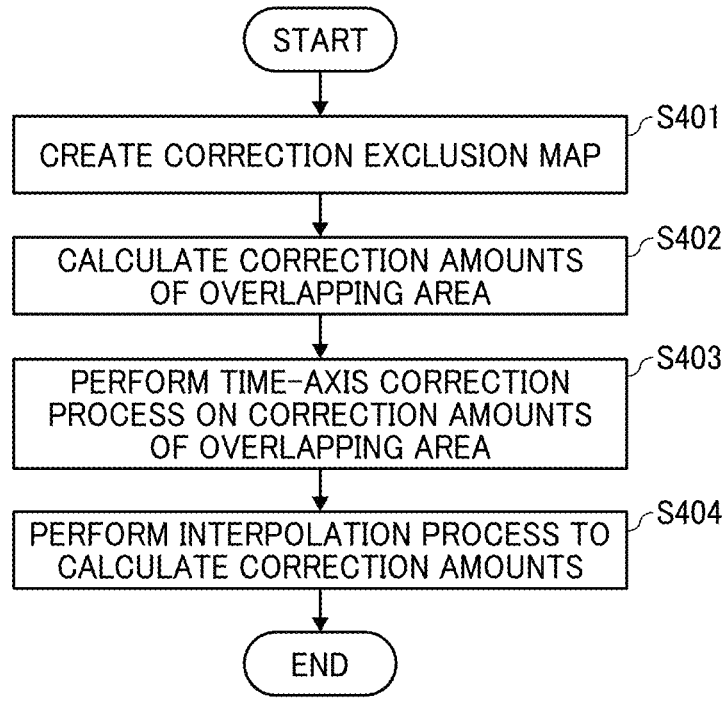
FIGS. 16A and 16B are flowcharts illustrating procedures of processes performed when the correction amount calculating unit performs the time-axis correction process.
Figure 16B:
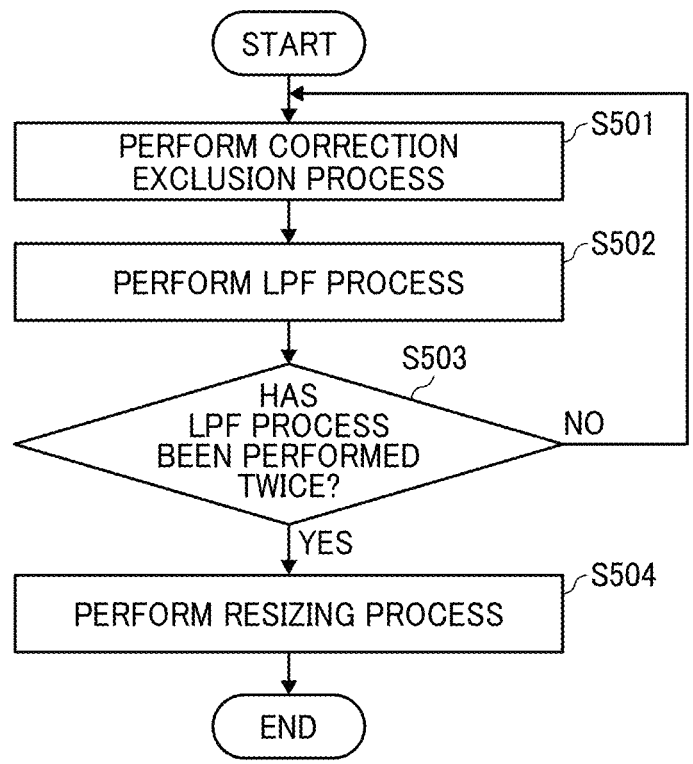

The time-axis correction process is not necessarily performed by the image correcting unit 23, and may be performed by the correction amount calculating unit 22, as illustrated in FIGS. 16A and 16B.

FIG. 16A illustrates a procedure of a process performed by the correction amount calculating unit 22. This procedure is similar to that of the flowchart in FIG. 10 except that the time-axis correction process takes place after the calculation of the correction amounts of the overlapping area 30.

FIG. 16B illustrates a procedure of a process performed by the image correcting unit 23. This procedure is similar to that of the flowchart in FIG. 11 except that the time-axis correction process of step S304 is omitted.

With the process performed in accordance with the procedure of FIG. 16A, there is no need to perform calculation for all of the correction values, thereby reducing the processing time.

In the process of the correction amount calculating unit 22 in FIG. 16A, the correction amount calculating unit 22 first creates the correction exclusion map that specifies the area excluded from the correction (step S401). The correction amount calculating unit 22 then calculates the correction amounts of the overlapping area 30 from the evaluation value of the evaluation areas 35 in the overlapping area 30 expressed as the mean or variance (step S402). Thereafter, the correction amount calculating unit 22 performs the time-axis correction process on the correction amounts of the overlapping area 30 (step S403), and performs the interpolation process to calculate the correction amounts of the correction target image based on the correction amounts obtained at step S403, to thereby create the correction amount map (step S404).

In the process of the image correcting unit 23 in FIG. 16B, the image correcting unit 23 first performs the correction exclusion process of applying the correction exclusion map to the correction amount map created by the correction amount calculating unit 22 to correct the correction amount map (step S501), and then performs the LPF process (step S502). The image correcting unit 23 then determines whether the LPF process has been performed twice (step S503). If the LPF process has not been performed twice (NO at step S503), the image correcting unit 23 returns to step S501. If the LPF process has been performed twice (YES at step S503), the image correcting unit 23 performs the process of resizing the correction amount map (step S504).

The image processing system 20, the imaging device 10 including the image processing system 20, and the image processing method according to the present embodiment enable low-delay correction of the boundary between the combined images of the spherical image in the process of correcting the spherical image, without causing an uncomfortable feeling to a viewer during the transition between the frames. This correction process is applicable to a system that streams an omnidirectional video formed of a plurality of combined images.

The above-described functions of the image processing may be implemented by a program for causing a computer or a programmable device to execute the functions, for example.

A program of the present embodiment causes an image processing system to execute an image processing method of performing image processing on a plurality of images acquired from a plurality of image sensors and including an overlapping area. The image processing method includes calculating an evaluation value to evaluate each of the plurality of images with a pixel value of at least one pixel in the overlapping area, determining a correction target image based on the evaluation value, calculating a plurality of correction amounts of the overlapping area for each of the plurality of images, performing a correction process on each of the plurality of images based on the plurality of correction amounts to correct the plurality of images, and combining the corrected plurality of images to generate a spherical image.

Further, the plurality of images form each of a plurality of frames of a video, and the image processing method includes correcting the plurality of correction amounts between each adjacent two of the plurality of frames.

The image processing system 20 of the present embodiment may be implemented by reading and executing the above-described program from a storage medium. The storage medium for providing the program may be a hard disk, an optical disk, a magneto-optical disk, a non-volatile memory card, or a ROM, for example. After the program is read from the storage medium and stored in a memory, actual processing of the image processing system 20 may be entirely or partially executed by the CPU 26, for example, based on instructions of the program. In this case, the functions of the image processing system 20 are implemented through the processing of the CPU 26. Alternatively, the program for image processing may be provided by a server through communication via a network.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image processing apparatus comprising:
processing circuitry configured to,
acquire a plurality of images respectively captured with a plurality of imaging elements, the plurality of images respectively corresponding to a plurality of frames of a video,
calculate, for a current frame, an evaluation value to be used for evaluating each of the plurality of images using a pixel value of at least one pixel in an overlapping area of the plurality of images,
determine at least one correction target image from the plurality of images based on the evaluation value calculated for the current frame and an evaluation value in a preceding frame stored in a memory such that the correction target image is selected from among the plurality of images associated with the current frame by, for each of the plurality of images associated with the current frame, evaluating a difference between (i) the evaluation value calculated for a respective one of the plurality of images associated with the current frame and (ii) the evaluation value in the preceding frame,
calculate a plurality of correction amounts to be used for correcting a plurality of evaluation values in the overlapping area of the correction target image, based on the evaluation value of the correction target image, and
correct the correction target image based on the plurality of correction amounts.

2. The image processing apparatus of claim 1,
wherein the processing circuitry is configured to determine the correction target image for the current frame by referring to the evaluation value of at least one of the plurality of images in the preceding frame.

3. The image processing apparatus of claim 2,
wherein the at least one of the plurality of images in the preceding frame having the evaluation value that is referred is an image that has not been corrected.

4. The image processing apparatus of claim 2,
wherein the processing circuitry is configured to perform a time-axis correction process of correcting the plurality of correction amounts between adjacent ones of the plurality of frames captured sequentially with a same one of the plurality of imaging elements.

5. The image processing apparatus of claim 4, wherein the processing circuitry is configured to perform the time-axis correction process of correcting the plurality of correction amounts between the adjacent ones of the plurality of frames captured sequentially with the same one of the plurality of imaging elements such that the processing circuitry reduces variations of the plurality of correction amounts between frames by performing inter-frame correction on a time-axis.

6. The image processing apparatus of claim 1, wherein the overlapping area is set in pixel units.

7. The image processing apparatus of claim 1,
wherein the processing circuitry is further configured to combine the plurality of images including the correction target image that has been corrected to generate a spherical image.

8. A system comprising:
the image processing apparatus of claim 1; and
the plurality of imaging elements configured to respectively capture the plurality of images.

9. The image processing apparatus of claim 1, wherein the plurality of correction amounts indicate changes in one or more of luminance and color.

10. An image processing method comprising:
acquiring a plurality of images respectively captured with a plurality of imaging elements, the plurality of images respectively corresponding to a plurality of frames of a video;
calculating, for a current frame, an evaluation value to be used for evaluating each of the plurality of images using a pixel value of at least one pixel in an overlapping area of the plurality of images;

determining at least one correction target image from the plurality of images based on the evaluation value calculated for the current frame and an evaluation value in a preceding frame stored in a memory such that the correction target image is selected from among the plurality of images associated with the current frame by, for each of the plurality of images associated with the current frame, evaluating a difference between (i) the evaluation value calculated for a respective one of the plurality of images associated with the current frame and (ii) the evaluation value in the preceding frame;

calculating a plurality of correction amounts to be used for correcting a plurality of evaluation values in the overlapping area of the correction target image, based on the evaluation value of the correction target image; and correcting the correction target image based on the plurality of correction amounts.

11. The image processing method of claim 10, wherein the determining includes:

referring to the evaluation value of at least one of the plurality of images in the preceding frame to determine the correction target image in the current frame, when the determination result indicates that the evaluation value in the preceding frame is stored.

12. The image processing method of claim 11,
wherein the at least one of the plurality of images in the preceding frame having the evaluation value that is referred is an image that has not been corrected.

13. The image processing method of claim 10, further comprising:

performing a time-axis correction process of correcting the plurality of correction amounts between adjacent ones of the plurality of frames captured sequentially with a same one of the plurality of imaging elements.

14. The image processing method of claim 13, wherein the performing the time-axis correction process performs the time-axis correction process of correcting the plurality of correction amounts between the adjacent ones of the plurality of frames captured sequentially with the same one of the plurality of imaging elements such that the processing circuitry reduces variations of the plurality of correction amounts between frames by performing inter-frame correction on a time-axis.

15. The image processing method of claim 10, wherein the plurality of correction amounts indicate changes in one or more of luminance and color.

16. A non-transitory recording medium storing a program for causing one or more processors to execute an image processing method, the image processing method comprising:

acquiring a plurality of images respectively captured with a plurality of imaging elements, the plurality of images respectively corresponding to a plurality of frames of a video;

calculating, for a current frame, an evaluation value to be used for evaluating each of the plurality of images using a pixel value of at least one pixel in an overlapping area of the plurality of images;

determining at least one correction target image from the plurality of images based on the evaluation value calculated for the current frame an evaluation value in a preceding frame stored in a memory such that the correction target image is selected from among the plurality of images associated with the current frame by, for each of the plurality of images associated with the current frame, evaluating a difference between (i) the evaluation value calculated for a respective one of the plurality of images associated with the current frame and (ii) the evaluation value in the preceding frame;

calculating a plurality of correction amounts to be used for correcting a plurality of evaluation values in the overlapping area of the correction target image, based on the evaluation value of the correction target image; and correcting the correction target image based on the plurality of correction amounts.

17. The non-transitory recording medium of claim 16, wherein the program causes one or more processors to execute the image processing method, where the image processing method further comprises:

performing a time-axis correction process of correcting the plurality of correction amounts between adjacent ones of the plurality of frames captured sequentially with a same one of the plurality of imaging elements.

18. The non-transitory recording medium of claim 17, wherein the performing the time-axis correction process performs the time-axis correction process of correcting the plurality of correction amounts between the adjacent ones of the plurality of frames captured sequentially with the same one of the plurality of imaging elements such that the processing circuitry reduces variations of the plurality of correction amounts between frames by performing inter-frame correction on a time-axis.

19. The non-transitory recording medium of claim 16, wherein the plurality of correction amounts indicate changes in one or more of luminance and color.

* * * * *